Patented Sept. 22, 1925.

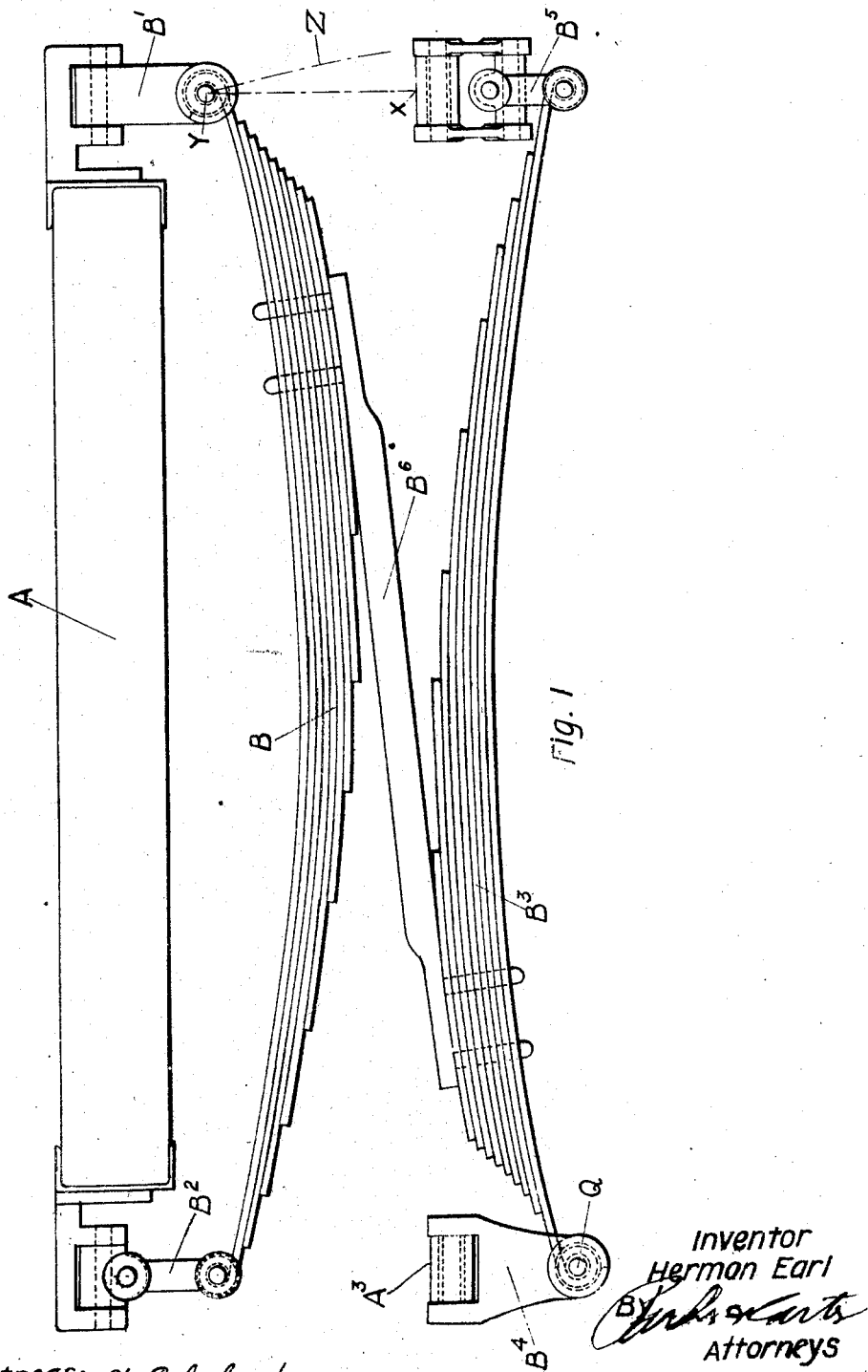

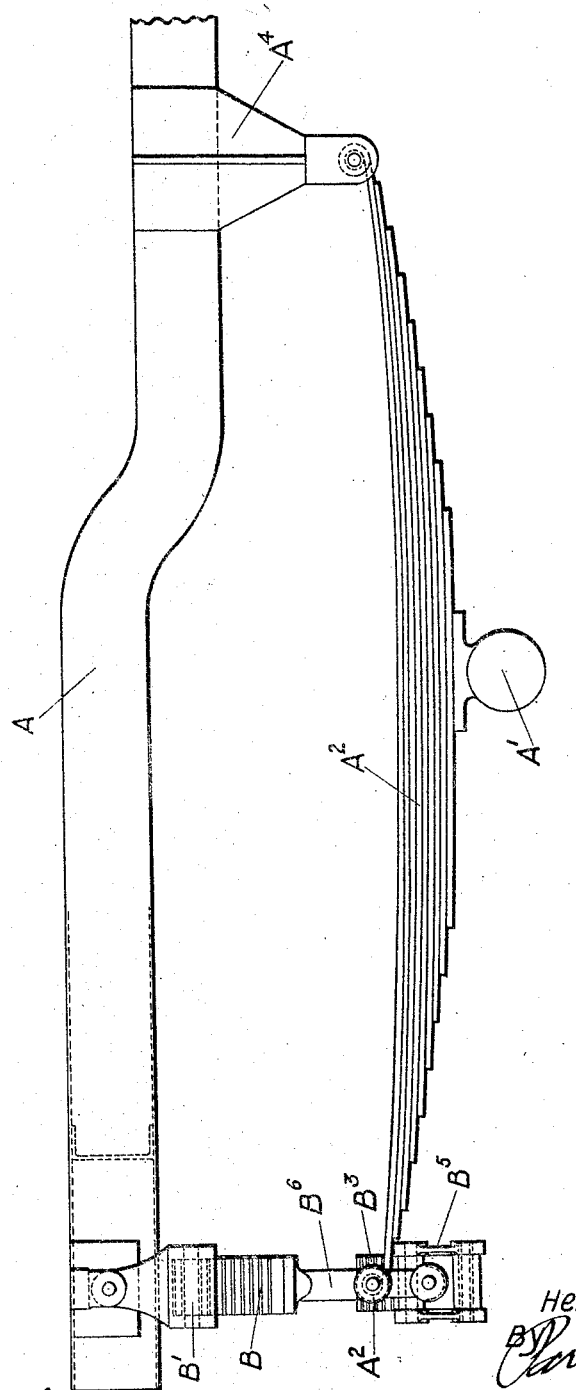

1,554,263

UNITED STATES PATENT OFFICE.

HERMON EARL, OF FREEPORT, ILLINOIS.

SPRING SUSPENSION.

Application filed October 11, 1919. Serial No. 329,973.

*To all whom it may concern:*

Be it known that I, HERMON EARL, a citizen of the United States, residing at Freeport, in the county of Stephenson and State of Illinois, have invented a certain new and useful Improvement in Spring Suspensions, of which the following is a specification.

My invention relates to improvements in spring suspensions and has for one object to provide a platform spring which will be free from the disagreeable and dangerous side sway ordinarily present in connection with a platform spring suspension.

The reason for the side sway in the normal platform spring suspension is that you have a swinging link connection between each of the two side springs and the ends of the cross spring made necessary to provide for the elongation of the cross spring as it deflects. My invention therefore, comprises means for taking care of the elongation of the cross spring and at the same time providing a connection between the ends of the side springs and the body, the length of which does not vary as the springs deflect. I do this by associating with the cross spring and making in my preferred form, a part of the cross spring assembly, a rigid connecting member extending diagonally across from the side spring on one side of the vehicle to the opposed side of the vehicle itself so that when the spring is deflected, this rigid member merely rotates but does not elongate thus there is no opportunity for a side sway because the only movement of the vehicle body with respect to the side spring is that slight movement caused by the change in horizontal distance between the end of the cross spring and the point where the rigid member is attached to the vehicle body.

Another feature of my invention is that the rigid connection between the two parts of the transverse spring tends to support the flexible ends of the springs and as the springs are deflected, they come into engagement with the rigid connection and thus their effective lengths are decreased. This gives a progressive spring action and as the effective lengths of the springs decrease their ability to support the load increases and thus the load is more readily though gradually transferred from the relatively flexible cross springs to the stiffer side springs. This makes it possible to have an exceedingly flexible cross spring so that slight road shocks are absorbed, leaving the heavier stiffer side spring to come into operation later in the cycle.

Another feature of my invention is that because I use cross springs stiff at one end and flexible at the other it is necessary for me to have two of them reversed with respect to each other, that is the stiff end of one overlying the flexible end of the other, and as the two springs are deflected, the springs themselves change their angular position with respect to the surface upon which the vehicle travels and with respect to the vehicle frame, but the vehicle frame retains its parallelism with the surface upon which it travels.

My invention therefore, has for one object to provide a new and improved form of platform spring suspension. Another object is to provide a special flexible spring suspension associated with the normal rigid side spring suspension. Another object is to prevent side sway of the vehicle. Other objects of my invention will appear from time to time in the specification.

My invention is illustrated more or less diagrammatically in the accompanying drawings wherein—

Figure 1 is a diagrammatic rear view of the vehicle showing my spring suspension in operation;

Figure 2 a side elevation of the rear end of the vehicle showing my spring suspension;

Like parts are indicated by like characters throughout the drawings.

A is a vehicle frame, $A^1$ the vehicle axle, $A^2$—$A^3$ the vehicle side springs resting upon the axle pivoted at their forward ends on brackets $A^4$ on the vehicle frame.

B is a cross spring stiff at the right hand end as indicated and pivoted on a link $B^1$ free to rotate about an axis perpendicular to the vehicle axis but held against rotation about an axis parallel with the vehicle axis. The result is the stiff end of the spring B is held against longitudinal movement. The flexible end of the spring B is pivoted on a link $B^2$ free to swing about two axes perpendicular to and parallel with the axis of the vehicle frame, thus the free flexible end of the spring B is free to extend out or expand as the spring lengthens when it is deflected. $B^3$ is a similar cross spring stiff at one end, flexible at the other but the stiff end of the spring $B^3$ is on the opposed side of the vehicle from the stiff end of the spring B. B⁴ is a link pivoted on the rear end of the side spring A³ upon which the rigid end of the spring B³ is rigidly mounted. This link B⁴ is free to swing about an axis perpendicular to the vehicle axis but held against movement in any other direction, thus the spring B³ at its stiff end, is held against longitudinal movement. B⁵ is a link connection between the flexible end of the spring B³ and the free end of the side spring A². This link connection is free to swing about axes both perpendicular to and parallel with the vehicle axis and so the flexible end of the spring B³ is free to extend outwardly as the spring is deflected. B⁶ is a rigid tie bar anchored at either end to the springs B—B² at their stiff ends and extending therefore, diagonally across the vehicle between them. The result of this is that the two stiff ends of the cross springs together with the bar B⁶ form what is in effect, a rigid radius bar extending from the end of the spring A³ on the left hand of the vehicle to the spring perch or bracket on the right hand side of the vehicle. The side spring is stiff enough and broad enough so that its end does not have any lateral or sideways movement and always remains the same distance from the plane of the wheels. That being the case, the only sidewise movement that the vehicle body can have is that movement represented by the horizontal distance between the line $x$—$y$ and the arc $y$—$z$—$x$ which is described about the pivot point $q$ where the spring B³ is pivoted on the spring A³ and this distance is a comparatively small one, so small as to be negligible. Meanwhile the two cross springs can extend as much as necessary to compensate for their normal deflection without permitting any lateral displacement of the vehicle with respect to the supporting axle.

It will be evident that while I have shown in my drawings an operative device, still many changes might be made in the size, shape and arrangement of the parts without departing materially from the spirit of my invention and I wish therefore, that my drawings be regarded, as in a sense, diagrammatic.

The use and operation of my invention are as follows:

When the springs are deflected, the flexible ends of the transverse springs will give and the right hand end of one of the cross springs will be deflected as much as the left hand end of the other and so the vehicle body will rise and fall evenly. The point of contact between the spring and the rigid tie rod moves toward the center of the vehicle and thus shortens the unsupported ends of the springs. That stiffens up the cross springs until a point is reached at which the application of further load will cause a deflection of the side springs. From that point on both the side springs and the transverse springs will be in operation whereas, at the beginning of the cycle, the more flexible transverse springs normally absorb all the load, or are the only ones subject to deflection. As the cross spring yields, the stiff radius bar connection made up of the tie bar and the stiff ends of the two cross springs, will merely rotate about its two pivot points, one on the body, the other on the side spring and the vehicle will be held against side sway by this stiff connection. The slight movement sidewards of the vehicle caused by the eccentricities of the connection will of course, be negligible and the body will always be under full control of the spring connection and never be free to swing loosely.

I claim:

1. A spring suspension for road vehicles comprising two flat leaf springs lying in the same vertical plane adjacent to each other, and each stiff at one end and flexible at one end, the stiff end of each spring being adjacent the flexible end of the other, and a rigid connection between their stiff ends.

2. A spring suspension for road vehicles comprising two flat leaf springs arranged one above the other, and each stiff at one end and flexible at the other end, the stiff end of each spring being adjacent the flexible end of the other, and a rigid connection between their stiff ends.

3. A spring suspension for road vehicles comprising two flat leaf springs adjacent to each other and each stiff at one end and flexible at one end, the stiff end of each spring being adjacent the flexible end of the other, and a radius bar located between the two springs and rigidly attached to each at its stiff end.

4. A spring suspension for road vehicles comprising two flat leaf springs arranged one above the other, and each stiff at one end and flexible at the other end, the stiff end of each spring being adjacent the flexible end of the other, and a radius bar located between the two springs and rigidly attached to each at its stiff end.

5. A spring suspension for road vehicles comprising two flat leaf springs adjacent to each other and each stiff at one end and flexible at one end, the stiff end of each spring being adjacent the flexible end of the other, and a radius bar located between the two springs and rigidly attached to each at its stiff end, said radius bar extending diagonally between the springs.

6. A spring suspension for road vehicles comprising two flat leaf springs adjacent to each other and each stiff at one end and flexible at one end, the stiff end of each spring being adjacent the flexible end of the other, and a radius bar located between the two springs and rigidly attached to each at its stiff end, the relation between each spring and the radius bar being such that as the spring is deflected the point of contact between it and the radius bar progressively travels towards its flexible end.

7. A spring suspension for road vehicles comprising two flat leaf springs adjacent to each other and each stiff at one end and flexible at one end, the stiff end of each spring being adjacent the flexible end of the other, and a radius bar located between the two springs and rigidly attached to each at its stiff end, said radius bar extending diagonally between the springs, the relation between each spring and the radius bar being such that os the spring is deflected the point of contact between it and the radius bar progressively travels toward its flexible end.

8. A spring suspension for road vehicles comprising side springs mounted on the vehicle axle and a cross spring joining them and connecting to the vehicle itself, comprising two flat leaf springs lying in the same vertical plane adjacent each other, the flexible end of each spring being adjacent the stiff end of the other spring.

9. A spring suspension for road vehicles comprising side springs mounted on the vehicle axle, and a cross spring joining them and connecting to the vehicle itself, comprising two flat leaf springs, each stiff at one end and flexible at the other, the stiff end of each spring being adjacent the flexible end of the other spring, and a rigid connection between their stiff ends.

10. A spring suspension for road vehicles comprising side springs mounted on the vehicle axle and a cross spring joining them and connecting to the vehicle itself, comprising two flat leaf spring adjacent each other, the flexible end of each spring being adjacent the stiff end of the other, and a radius bar located between the two springs and rigidly attached to each at its stiff end.

11. A spring suspension for road vehicles comprising side springs mounted on the vehicle axle and a cross spring joining them and connecting to the vehicle itself, comprising two substantially parallel flat leaf springs adjacent each other, the flexible end of each spring being adjacent the stiff end of the other, and an inclined rigid member connecting the stiff ends of the springs.

12. A spring suspension for road vehicles comprising side springs mounted on the vehicle axle, and a cross spring joining them and connecting to the vehicle itself, comprising two flat leaf springs lying in the same vertical plane adjacent each other, the flexible end of each spring being adjacent the stiff end of the other, said cross spring being more flexible than said side springs.

13. A spring suspension for road vehicles comprising side springs mounted on the vehicle axle, and a cross spring joining them, and connecting to the vehicle itself comprising two flat leaf springs adjacent each other, the flexible end of each spring being adjacent the stiff end of the other, a rigid connection between the stiff ends, said spring normally more flexible than the side springs, but adapted to become progressively stiffer in response to an increased load.

14. A spring suspension for road vehicles comprising side springs mounted on the vehicle axle, and a cross spring joining them, and connecting to the vehicle itself comprising two flat leaf springs adjacent each other, the flexible end of each spring being adjacent the stiff end of the other, a rigid connection between the stiff ends, said springs normally more flexible than the side springs, but adapted to become progressively stiffer in response to an increased load by the compression of each of said leaf springs against the rigid connection, and the progressive shortening of the free flexible section out of contact with said rigid connection.

15. A spring suspension for road vehicles comprising side springs mounted on the vehicle axle, and a cross spring joining them and connecting to the vehicle itself, comprising two flat leaf springs adjacent each other, the flexible end of each spring being adjacent the stiff end of the other, a rigid member connecting the stiff ends, said cross springs normally more flexible than said side springs but adapted to be progressively stiffened in response to an increased load by the compression together of said leaf springs against said connecting member and a consequent shortening of the flexible sections out of contact with said member.

16. A spring support for road vehicles comprising an inclined rigid member mounted beneath the vehicle body and a plurality of yielding spring members secured at each end thereof and projecting diagonally away therefrom, one of said members secured at either end to the vehicle body and the other at either end of the running gear.

17. A spring support for road vehicles comprising an inclined rod positioned beneath the rear of the vehicle and a plurality of yielding spring members, having flexible ends and stiff ends secured to said rod at either end thereof and projecting diagonally away therefrom, one of said spring members being pivoted to the running gear and the other being pivoted to the vehicle body, said springs being quarter elliptics, the stiff ends of said springs being secured to said rod.

18. A spring support for road vehicles comprising side springs mounted on the axle, an inclined, rigid member mounted beneath the vehicle body, a plurality of yielding spring members secured to either end thereof and projecting diagonally and extending therealong, one of said members secured to the vehicle body and the other to the running gear.

19. In a spring suspension for road vehicles, a plurality of cross springs lying in the same vertical plane, a stiff tying member secured at its ends to the opposite ends of each of said springs, one of said springs being pivotally supported at each end on the running gear and the other being pivotally supported at each end on the vehicle body, the tying member being free to swing about the pivots of the spring ends to which it is secured, its length being constant and independent of the deflection of the springs.

20. A spring support for road vehicles comprising side springs mounted on the axle, an inclined rigid member mounted beneath the vehicle body, a quarter-elliptic leaf spring secured to either end thereof and projecting diagonally away therefrom, one of said leaf springs secured at each end to the vehicle body and the other secured at each end to the running gear.

In testimony whereof, I affix my signature this 7th day of October, 1919.

HERMON EARL.